US008471528B2

(12) United States Patent  
Toba et al.

(10) Patent No.: US 8,471,528 B2  
(45) Date of Patent: Jun. 25, 2013

(54) SECONDARY BATTERY CONTROLLING APPARATUS AND CONTROLLING METHOD (75) Inventors: Koji Toba, Tokyo (JP); Mari Tanaka, Tokorozawa (JP); Takenori Kobayashi, Kawasaki (JP); Yoshihiro Ogita, Tokyo (JP); Akinori Nishi, Tokyo (JP); Ryoichi Ichikawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 227 days.

(21) Appl. No.: 12/602,219

(22) PCT Filed: Oct. 2, 2008

(86) PCT No.: PCT/JP2008/067894  
§ 371 (c)(1),  
(2), (4) Date: Nov. 30, 2009

(87) PCT Pub. No.: WO2010/016158  
PCT Pub. Date: Feb. 11, 2010

(65) Prior Publication Data  
US 2010/0187907 A1 Jul. 29, 2010

(30) Foreign Application Priority Data  
Aug. 4, 2008 (JP) ................................ 2008-201016

(51) Int. Cl.  
*H02J 7/00* (2006.01)  
*H02J 7/16* (2006.01)

(52) U.S. Cl.  
USPC ............ 320/128; 320/135; 320/148; 320/160

(58) Field of Classification Search  
USPC ................. 320/128, 127, 134, 135, 136, 148, 320/160, 161, 162; 324/425, 426  
See application file for complete search history.

(56) References Cited

U.S. PATENT DOCUMENTS 5,656,915 A * 8/1997 Eaves ............................ 320/118  
6,621,250 B1 * 9/2003 Ohkubo et al. ............... 320/136  
(Continued)

FOREIGN PATENT DOCUMENTS

JP 2004 274981 9/2004  
JP 2006 42422 2/2006  
(Continued)

*Primary Examiner* — Edward Tso  
*Assistant Examiner* — Alexis Boateng  
(74) *Attorney, Agent, or Firm* — Oblon, Spivak, McClelland, Maier & Neustadt, L.L.P.

(57) ABSTRACT

To provide a secondary battery controlling apparatus and a controlling method that can keep a storage amount of a secondary battery used for supply and demand control of a power system not close to 100% or 0%. The present invention is a power supply and demand controlling apparatus of a small-scaled power system 1 including distributed power supplies 31, 32, . . . 3n including a secondary battery and a controlling method, wherein the secondary battery controlling apparatus includes a power generation planning part 6 calculating a planned output value of the distributed power supply based on a past load power and output data including track record data of a power generation output, a planned storage amount estimating part 7 estimating a planned storage amount of the secondary battery from the planned output value of the secondary battery calculated at the power generation planning part, an actual output detecting part 8 measuring and detecting an actual output value of the secondary battery, an actual storage amount estimating part 9 estimating an actual storage amount from the actual output value of the secondary battery detected at the actual output detecting part, and a storage amount controlling part 10 controlling the actual storage amount back to the planned storage amount if there is a difference between the planned storage amount estimated at the planned storage amount estimating part and the actual storage amount estimated at the actual storage amount estimating part.

4 Claims, 4 Drawing Sheets

U.S. PATENT DOCUMENTS

| | | | |
|---|---|---|---|
| 7,045,989 B2 * | 5/2006 | Sakakibara et al. | 320/106 |
| RE39,908 E * | 11/2007 | Ikawa et al. | 320/136 |
| 7,554,296 B2 * | 6/2009 | Mizuno et al. | 320/132 |
| 7,957,921 B2 * | 6/2011 | Tang et al. | 702/63 |
| 2005/0156570 A1 * | 7/2005 | Inui et al. | 320/132 |
| 2008/0007221 A1 * | 1/2008 | Lee | 320/128 |
| 2008/0252259 A1 * | 10/2008 | Suzuki et al. | 320/136 |

FOREIGN PATENT DOCUMENTS

| | | |
|---|---|---|
| JP | 2006 141093 | 6/2006 |
| JP | 2008 154360 | 7/2008 |

* cited by examiner

SECONDARY BATTERY CONTROLLING APPARATUS AND CONTROLLING METHOD

TECHNICAL FIELD

The present invention relates to power supply and demand control of a small-scaled power system including a secondary battery as a power storing apparatus and, more particularly, to a secondary battery controlling apparatus for absorbing a power fluctuation and a controlling method.

BACKGROUND ART

There are small-scaled power systems called a microgrid or the like supplying power to consumers in a specific region by using plural kinds of distributed power supplies (see Patent document 1) such as an engine generator, a turbine generator, a power storing apparatus, a fuel cell, and a natural energy generating apparatus such as solar power generation and wind power generation which are provided in the specified region.

If a small-scaled power system is interconnected to a commercial power system of a power company, there are cases of a normal power flow in which power is received from the commercial power system and a reverse power flow in which power is supplied to the commercial power system.

In any case, power supply and demand control of a distributed power supply in a small-scaled system is required in which a power flow (electric energy amount) at any point in the power system, or a deviation between a load power and a power generation output in the small-scaled power system is kept constant.

In the power supply and demand control of the small-scaled power system, a secondary battery is used with an engine generator, a turbine generator and a fuel cell to absorb a power fluctuation generated in the small-scaled power system. Generally, the secondary battery absorbs a comparatively fast output fluctuation generated in a natural energy generating apparatus of the small-scaled power system and an abrupt load fluctuation generated in the small-scaled power system.

Patent Document 1: Japanese Patent Laid-Open No. 2001-327080

DISCLOSURE OF THE INVENTION

Problems to be Solved by the Invention

When supply and demand is controlled with a secondary battery, a possibility arises in which a storage amount of the secondary battery is nearly 100% or 0% if the secondary battery is used without grasping the storage amount of the secondary battery.

If the storage amount of the secondary battery has nearly been 100%, charging cannot be performed when charging is needed. If the storage amount of the secondary battery has nearly been 0%, discharging cannot be performed when discharging is needed. Because of this, a fluctuation in a power system cannot be compensated so that a supply-demand balance cannot be maintained.

In particular, fast fluctuation components of an output power in the natural energy generating apparatus or load power consumption may be generated. When the secondary battery compensates these fast fluctuations, the storage amount of the secondary battery is almost in balance if the secondary battery does not have a charge loss. Since the secondary battery actually has a charge loss, the storage amount keeps decreasing as time passes, resulting in a possibility of 0% in the storage amount.

In light of the above-described points, an object of the present invention is to provide a secondary battery controlling apparatus and a controlling method that can keep a storage amount of a secondary battery used for supply and demand control of a power system not close to 100% or 0%.

Means for Solving the Problems

In order to achieve the object, the present application provides invention of an apparatus and a method described below.

Initially, the invention of the apparatus is a power supply and demand controlling apparatus of a small-scaled power system including a distributed power supply including a secondary battery, characterized by including:

a power generation planning part calculating a planned output value of the distributed power supply based on a past load power and track record data of a power generation output;

a planned storage amount estimating part estimating a planned storage amount of the secondary battery from the planned output value;

an actual output detecting part detecting an actual output value of the secondary battery;

an actual storage amount estimating part estimating an actual storage amount from the actual output value of the secondary battery detected at the actual output detecting part; and a storage amount controlling part controlling the actual storage amount back to the planned storage amount if there is a difference between the planned storage amount and the actual storage amount.

Additionally, the invention of the method is a power supply and demand controlling method of a small-scaled power system including a distributed power supply including a secondary battery, characterized by including:

calculating a planned output value of the distributed power supply based on a past load power and track record data of a generation output;

estimating a planned storage amount of the secondary battery from the planned output value;

detecting an actual output value of the secondary battery;

estimating an actual storage amount from the actual output value of the secondary battery; and controlling the actual storage amount back to the planned storage amount if there is a difference between the planned storage amount and the actual storage amount.

DESCRIPTION OF SYMBOLS

1 . . . small-scaled power system, 2 . . . secondary battery, 31 to 3n . . . distributed power supply,

41 to 4m ... load system, 5 ... power supply and demand controlling apparatus, 6 ... power generation planning part of power supply and demand controlling apparatus, 7 ... planned storage amount estimating part of power supply and demand controlling apparatus, 8 ... actual output detecting part of power supply and demand controlling apparatus, 9 ... actual storage amount estimating part of power supply and demand controlling apparatus, 10 ... storage amount controlling part of power supply and demand controlling apparatus, 101 ... storage amount deviation estimating part of storage amount controlling part, 102 ... correction amount calculating part of storage amount controlling part, 103 ... secondary battery output instructing part of storage amount controlling part, 104 ... correction period adjusting part of storage amount controlling part

BEST MODE FOR CARRYING OUT THE INVENTION

Hereinafter, embodiments of the present invention are described with reference to the attached drawings.

Embodiment 1

Figure 1:
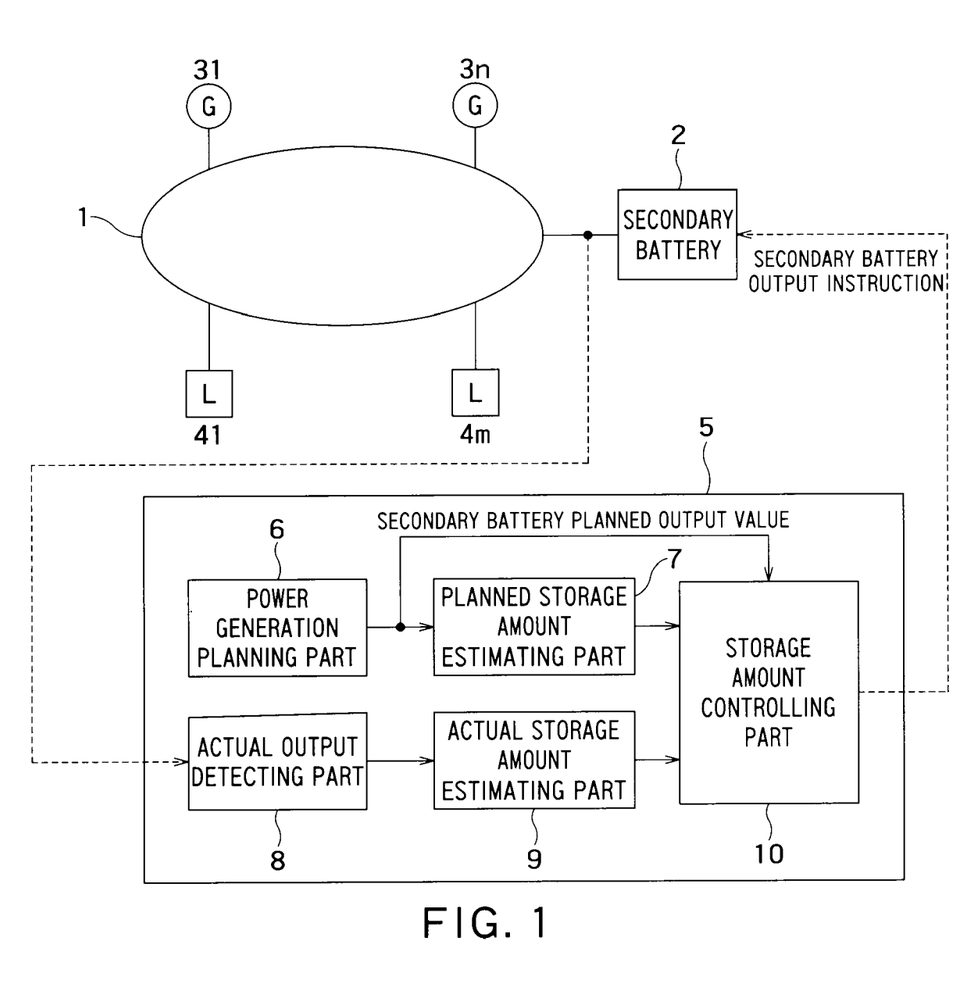
FIG. 1 is a block diagram showing a configuration of a secondary battery controlling apparatus according to an embodiment 1 of the present invention.

Initially, an embodiment 1 of the present invention is described with FIG. 1.

In FIG. 1, a secondary battery 2 and distributed power supplies 31 to 3n are connected to a small-scaled power system 1. The distributed power supplies 31 to 3n include an engine generator, a turbine generator, a power storing apparatus, a fuel cell and a natural energy generating apparatus.

Additionally, load systems 41 to 4n are connected to the small-scaled power system 1, and a power supply and demand controlling apparatus 5 provides an output instruction to the secondary battery 2 for controlling the small-scaled power system 1. The power supply and demand controlling apparatus 5 includes a power generation planning part 6, a planned storage amount estimating part 7, an actual output detecting part 8, an actual storage amount estimating part 9 and a storage amount controlling part 10.

In the embodiment 1, the power generation planning part 6 of the power supply and demand controlling apparatus 5 calculates a planned output value for a day of the distributed power supplies to 3n in the small-scaled power system 1 including the secondary battery 2 based on a past load power and output data such as a past track record of a power generation output in the distributed power supplies.

For example, a planned output value for a day every 30 minutes is calculated. The distributed power supplies 31 to 3n are driven based on the planned output value calculated at the power generation planning part 6. The planned storage amount estimating part 7 estimates a planned storage amount with the passage of time from the planned output value of the secondary battery 2 planned at the power generation planning part 6 by using a following formula (1).

$$\text{Estimated planned storage amount [kWh]} = P_0 + \int \{-Pa_{planned}(t) \times \text{Discharge efficiency} + Pb_{planned}(t) \times \text{Charge efficiency}\} dt \quad (1)$$

Here, $P_0$: Initial discharge power [kWh]
Pa planned: Planned discharge power [kWh]
$Pb_{planned}$: Planned charge power [kWh]

The actual output detecting part 8 detects a current actual output value of the secondary battery 2 connected to the small-scaled power system 1 by an active power detecting apparatus or the like, and transmits the detected value to the actual storage amount estimating part 9. The actual storage amount estimating part 9 estimates a current actual storage amount from the current output value of the secondary battery transmitted from the actual output detecting part 8 by using a following formula (2).

$$\text{Estimated actual storage amount [kWh]} = P_0 + \int \{-Pa_{actual}(t) \times \text{Discharge efficiency} + Pb_{actual}(t) \times \text{Charge efficiency}\} dt \quad (2)$$

Here, $P_0$: Initial discharge power [kWh]
$Pa_{planned}$: Actual discharge power [kWh]
$Pb_{planned}$: Actual charge power [kWh]

The estimated planned storage amount calculated at the planned storage amount estimating part 7 and the estimated actual storage amount calculated at the actual storage amount estimating part 9 are transmitted to the storage amount controlling part 10 in a certain period, for example, every 10 minutes. When the estimated planned storage amount and the estimated actual storage amount are transmitted, the storage amount controlling part 10 calculates a difference between the estimated planned storage amount and the estimated actual storage amount, or a deviation of the storage amount, and calculates an output instruction correction value of the secondary battery such that the difference disappears after 10 minutes, for example. Then, the storage amount controlling part 10 provides a value obtained by adding the correction value to a secondary battery output instruction value from the power generation planning part 6 as an output instruction value of the secondary battery 2, and the secondary battery 2 is operated.

According to the embodiment 1, the storage amount of the secondary battery can be maintained as planned because the difference (storage amount deviation) between the planned storage amount and the actual storage amount can be grasped and a signal adjusting an output instruction of the secondary can be generated so as to eliminate the storage amount deviation.

Embodiment 2

Figure 2:
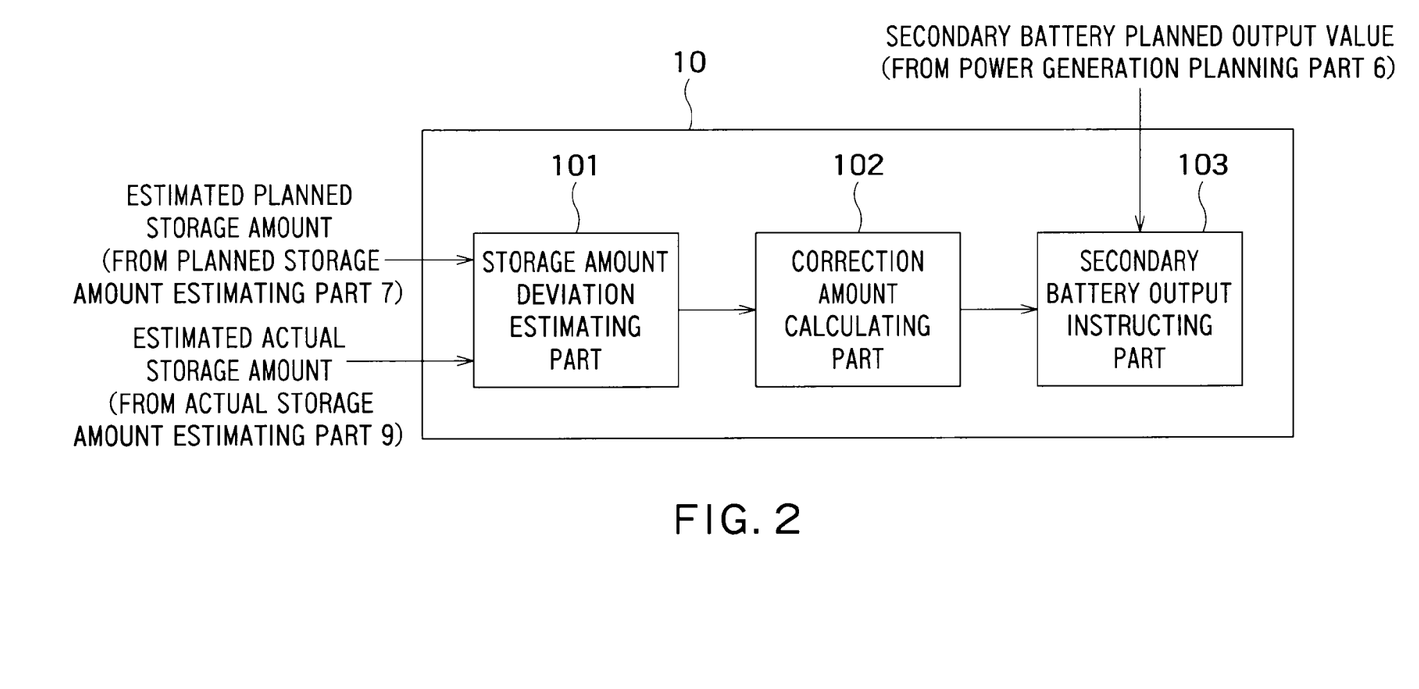
FIG. 2 is a block diagram showing a configuration of a storage amount controlling part used for an embodiment 2 of the present invention.

Next, an embodiment 2 of the present invention is described with FIG. 2. Components same as the embodiment 1 have the same reference numerals and redundant description is omitted.

In FIG. 2, the storage amount controlling part 10 has a storage amount deviation estimating part 101, a correction amount calculating part 102 and a secondary battery output instructing part 103.

Figure 3:
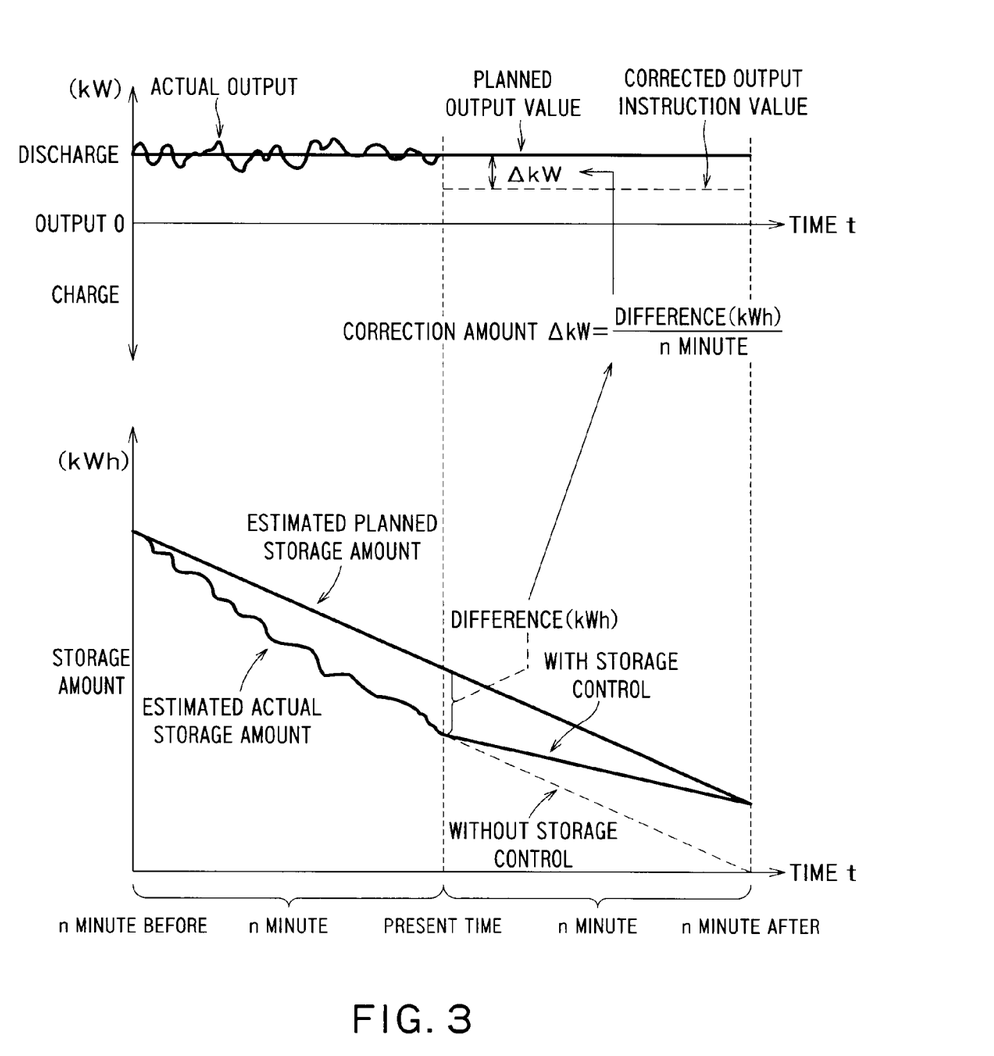
FIG. 3 is a characteristic diagram showing a secondary battery controlling method according to the embodiment 2 of the present invention.

In the embodiment 2 with this configuration, the storage amount deviation estimating part 101 calculates a difference (storage amount deviation) between an estimated planned storage amount transmitted in n-minute period from the planned storage amount estimating part 7 and an estimated actual storage amount transmitted in the n-minute period from the actual storage amount estimating part 9 by using a following formula (3), as shown in FIG. 3.

$$\text{Storage amount deviation (kWh)} = \text{estimated planned storage amount (kWh)} - \text{estimated actual storage amount (kWh)} \quad (3)$$

Here, in the case where the storage amount deviation occurs, a possibility arises in which the actual storage amount reaches a discharge end or a charge end as shown in FIG. 3 if an output of the secondary battery 2 is further continued according to an instruction value from the power generation planning part 6. Thus, the correction amount calculating part 102 calculates an output correction amount of the secondary battery for eliminating the storage amount deviation after n minute from a current storage amount deviation by using a following formula (4).

$$\text{Output instruction correction amount (kW)} = \text{difference between estimated planned storage amount and estimated actual storage amount (kWh)}/n \text{ minute} \quad (4)$$

The output instruction correction amount calculated at the correction amount calculating part 102 is transmitted to the secondary battery output instructing part 103. The secondary battery output instructing part 103 provides the secondary battery 2 with a value obtained by adding the output instruction correction amount to the secondary battery output instruction value of the power generation planning part 6 as an output instruction value to the secondary battery.

According to the embodiment 2, accurate output correction is performed so that the storage amount deviation disappears every certain period, and therefore, the storage amount of the secondary battery can be controlled as planned.

Embodiment 3

Figure 4:
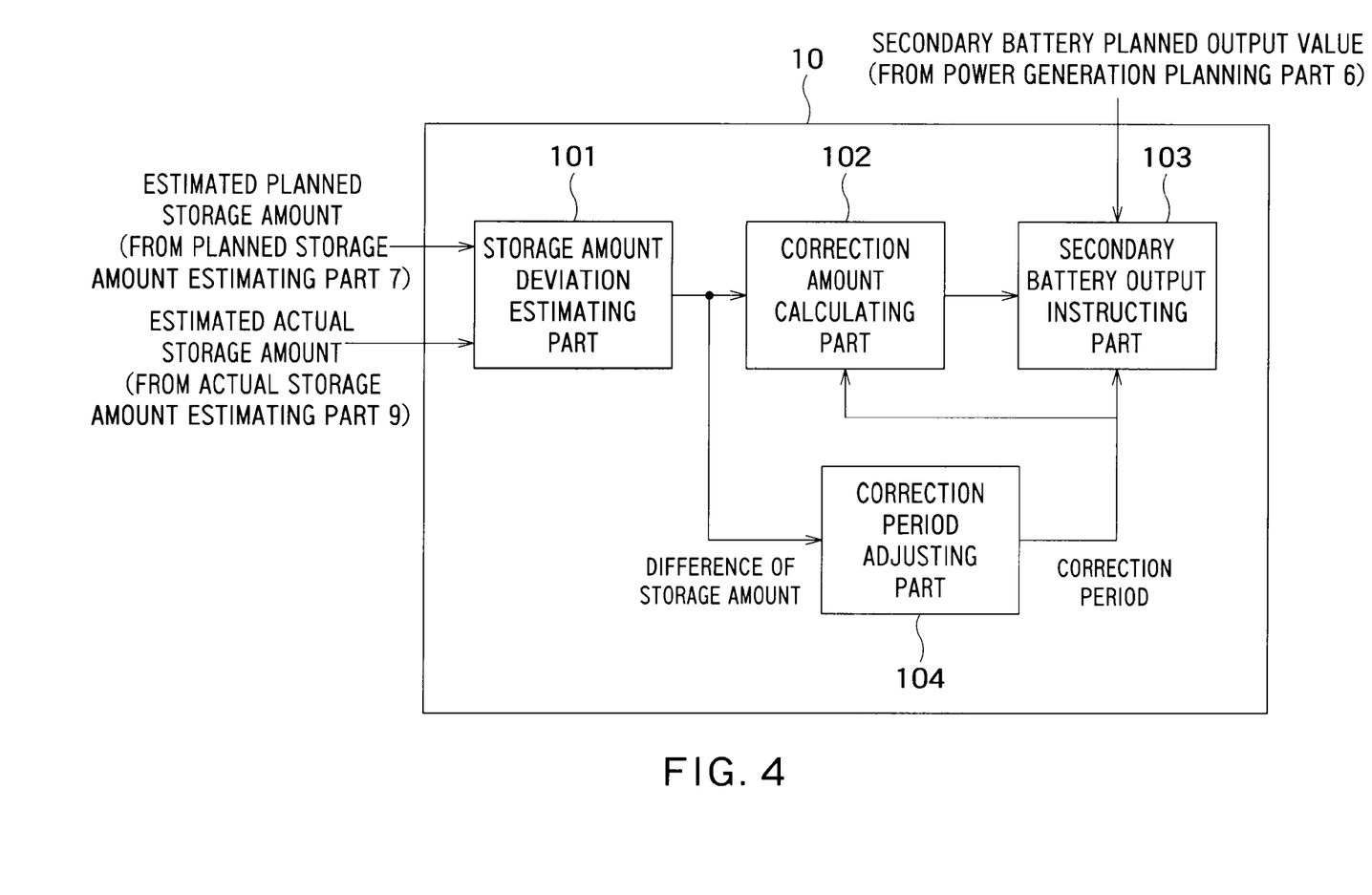
FIG. 4 is a block diagram showing a configuration of a storage amount controlling part used for an embodiment 3 of the present invention.

Next, an embodiment 3 of the present invention is described with FIG. 4. Components same as the embodiments 1 and 2 have the same reference numerals and redundant description is omitted.

In FIG. 4, the storage amount controlling part 10 of the power supply and demand controlling apparatus 5 has the storage amount deviation estimating part 101, the correction amount calculating part 102, the secondary battery output instructing part 103 and a correction period adjusting part 104.

In the embodiment 3, the storage amount deviation estimating part 101 transmits a difference between an estimated planned storage amount and an estimated actual storage amount, or a storage amount deviation to the correction amount calculating part 102 and also to the correction period adjusting part 104. The correction period adjusting part 104 determines whether a period for correcting an output of the secondary battery is changed based on the storage amount deviation transmitted from the storage amount deviation estimating part 101.

For example, if the storage amount deviation exceeds a threshold value set previously, the correction period adjusting part 104 outputs a correction period so as to change it to m minute whose period is shorter than that of n minute. If the storage amount deviation is the threshold value or less, the correction period adjusting part 104 outputs the correction period so as to set it n minute.

The correction period output from the correction period adjusting part 104 is transmitted to the correction amount calculating part 102 and the secondary battery output instructing part 103. The correction amount calculating part 102 calculates an output correction amount based on the correction period transmitted from the correction period adjusting part 104 by using a following formula (5).

$$\text{Output instruction correction amount (kW)} = \text{difference between estimated planned storage amount and estimated actual storage amount (kWh)}/\text{correction period} \quad (5)$$

Additionally, the secondary battery output instructing part 103 is also operated so as to correct the secondary battery output instruction value of the power generation planning part 6 by the period transmitted from the correction period adjusting part 104.

According to the embodiment 3, the actual storage amount can be controlled quickly back to the planned storage amount if the difference (storage amount deviation) between the planned storage amount and the actual storage amount is large.

Embodiment 4

Next, an embodiment 4 of the present invention is described with Table 1. Components same as the embodiment 3 have the same reference numerals and redundant description is omitted.

The correction period adjusting part 104 used for the embodiment 3 has a function capable of setting a threshold value of the storage amount deviation and a correction period to any value when the correction period is changed depending on magnitude of the difference of the storage amount. For example, a plurality of change levels of the correction period can be set, as shown in Table 1.

| Table of setting storage amount deviation and correction period | |
| --- | --- |
| Difference between Estimated planned storage amount and Estimated actual storage amount | Correction period of secondary battery instruction value |
| Less than 20% of secondary battery kWh capacity | 10 minutes period |
| 20-50% of secondary battery kWh capacity | 5 minutes period |
| More than 50% of secondary battery kWh capacity | 1 minute period |

The correction period adjusting part 104 refers to a change reference table set previously and arbitrarily and selects a correction period based on the difference between the estimated planned storage amount and the estimated actual storage amount transmitted from the storage amount deviation estimating part 101, and transmits the selected correction period to the correction amount calculating part 102 and the secondary battery output instructing part 103.

According to the embodiment 4, control with a high degree of freedom can be performed because a change of the correction period can be arbitrarily set depending on magnitude of the storage amount deviation.

INDUSTRIAL APPLICABILITY

As described above, the present invention can maintain the storage amount of the secondary battery as planned because a difference between the planned storage amount and the actual storage amount can be grasped and a signal adjusting the secondary battery output instruction can be generated so as to eliminate the difference.

The invention claimed is:
1. A secondary battery controlling apparatus comprising:
   a power generation planning part calculating a planned output wattage value of a distributed power supply based on a past load power and track record data of a power generation output wattage;
   a planned storage amount estimating part estimating a planned storage amount of the secondary battery from the planned output wattage value;
   an actual output wattage detecting part detecting an actual output wattage value of the secondary battery;
   an actual storage amount estimating part estimating an actual storage amount from the actual output wattage value of the secondary battery detected at the actual output wattage detecting part; and a storage amount controlling part controlling the actual storage amount back to the planned storage amount if there is a difference between the planned storage amount and the actual storage amount, wherein the storage amount controlling part includes:

a storage amount deviation estimating part calculating a difference between the planned storage amount and the actual storage amount;

a correction amount calculating part calculating an output wattage correction amount of the secondary battery necessary for eliminating the storage amount deviation calculated at the storage amount deviation estimating part; and a secondary battery output wattage instructing part outputting a value obtained by correcting the planned output wattage value by the output wattage correction amount as a second battery output wattage instruction value.

2. The secondary battery controlling apparatus according to claim 1, wherein the storage amount controlling part comprises:

a correction period adjusting part changing a control period of the correction amount calculating part and the secondary battery output wattage instructing part depending on a storage amount deviation output wattage from the storage amount deviation estimating part.

3. The secondary battery controlling apparatus according to claim 2, wherein the correction period adjusting part comprises:

a change determination value setting function setting a determination reference for changing a correction period to any value depending on the storage amount deviation output wattage from the storage amount deviation estimating part.

4. A secondary battery controlling method comprising:

calculating a planned output wattage value of a distributed power supply based on a past load power and track record data of a power generation output wattage;

estimating a planned storage amount of the secondary battery from the planned output wattage value;

detecting an actual output wattage value of the secondary battery;

estimating an actual storage amount from the actual output wattage value of the secondary battery;

controlling the actual storage amount back to the planned storage amount if there is a difference between the planned storage amount and the actual storage amount;

calculating a difference between the planned storage amount and the actual storage amount;

calculating an output wattage correction amount of the secondary battery necessary for eliminating the storage amount deviation; and outputting a value obtained by correcting the planned output wattage value by the output wattage correction amount as a second battery output wattage instruction value.

* * * * *

UNITED STATES PATENT AND TRADEMARK OFFICE
CERTIFICATE OF CORRECTION

PATENT NO. : 8,471,528 B2  
APPLICATION NO. : 12/602219  
DATED : June 25, 2013  
INVENTOR(S) : Koji Toba et al.

Page 1 of 1

It is certified that error appears in the above-identified patent and that said Letters Patent is hereby corrected as shown below:

On the title page, Item (86), the Application filing Date is incorrect. Item (86) should read:

--(86) PCT No.: PCT/JP2008/067894

§371 (c)(1),
(2), (4) Date: Feb. 26, 2010--

Signed and Sealed this
Third Day of September, 2013

Teresa Stanek Rea
*Acting Director of the United States Patent and Trademark Office*